Aug. 6, 1963  P. E. SNIDER ETAL  3,099,881
SUNDIAL
Filed Sept. 19, 1960
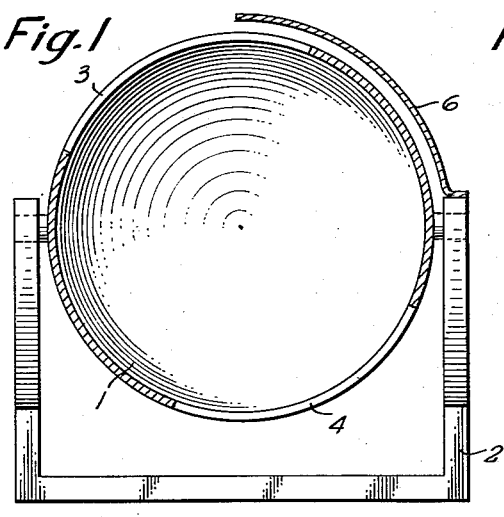
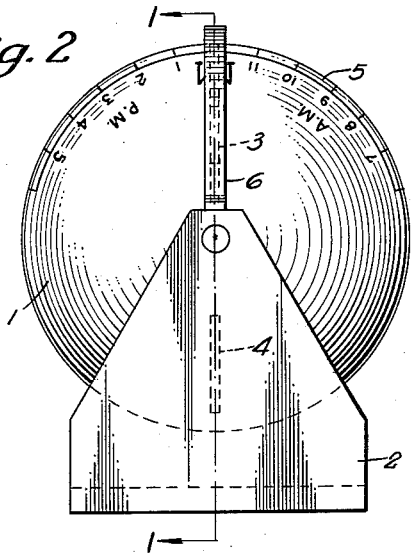
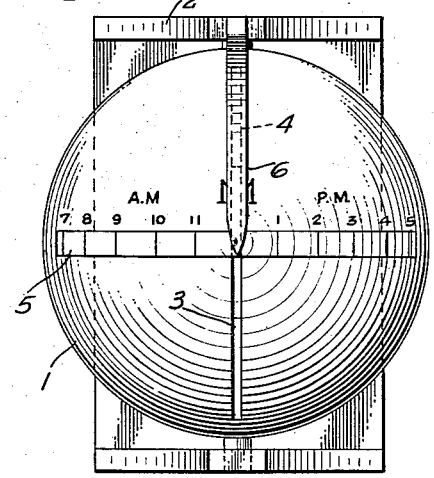
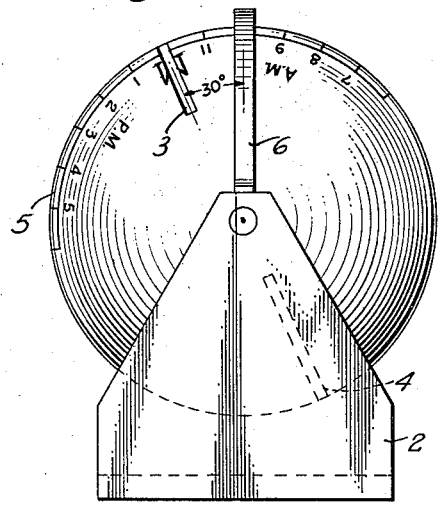
INVENTORS
Paul E. Snider
Hearl D. Jones

3,099,881
SUNDIAL
Paul E. Snider, 2616 Alanmede Road, and Hearl D. Jones, 114 N. 29th St., both of Louisville, Ky.
Filed Sept. 19, 1960, Ser. No. 57,032
2 Claims. (Cl. 33—62)

This invention relates to devices for determining the time of day without the use of the conventional time-determining instruments.

The principal object of the present invention is to provide a means of determining the time, when properly mounted on lawn, garden, or patio to the end that its novelty will attract the interest of and stimulate the conversation of guests and visitors, thereby making their appearance on the lawn, garden, or patio more pleasant.

The invention consists essentially of a hollow sphere mounted on a stand whereon it will turn easily. The sphere is cut by two diametrically opposed slots, of considerable length, in a plane containing the axis of rotation of said sphere. When properly mounted for use, the trunnion near the top (forward) slot always points due south. The trunnion near the bottom (rear) slot, of course, points due north. Beginning with "M" (for "Noon") in line with the top slot, a scale is laid off to left (a.m.), and to right (p.m.), along the transverse circumference as seen in FIG. 3, the hours being marked at intervals of 15 degrees. A pointer, fixed to the north standard, indicates the time.

To find the time, it is necessary only to turn the sphere to right or left (left for a.m., right for p.m.) until the sun shines through both slots at the same time.

At noon, standard time, the slots will line up vertically, the sun being on the meridian, except for variations such as that due to the width of the time zone. At 9:00 a.m., the slots will be diametrically opposed at an angle of 45 degrees, the top slot toward the east. At 2:00 p.m., the slots will be opposed at an angle of 30 degrees, the top (forward) slot toward the west. Half-hour and quarter-hour divisions are also marked on the scale.

The theory and use of the present invention will become apparent to the reader of the following description:

In the drawing:

FIGURE 1 is a sectional elevation looking west showing the sphere 1, mounted on the stand 2, the sun slots 3 and 4, the scale 5, and the pointer 6.

FIGURE 2 is an end elevation looking south. It shows the position of the sun slots, scale and pointer at noon, the sun slots in vertical registration, the sun being on the meridian.

FIGURE 3 is a plan view showing the scale 5 marked along the transverse circumference of the sphere 1. The sun slots are shown in this figure, too, their position indicating the hour of noon. Also the scale, pointer, and base are shown.

FIGURE 4 shows the position of the sun slots 3 and 4, the pointer 6, and the scale 5, when the time is 10:00 a.m.

Referring to the drawing wherein like numerals indicate like parts, it will be noted that, in use, sun slot 3 always points south (that is, the trunnion near sun slot 3). Sun slot 3 is also the top slot.

The theory of this invention is based on the fact that, since the sun, in relation to the earth, moves through 15 degrees arc per hour, to follow the sun through one hour's movement, the sun slot 3 would travel westward, or, to the right 15 degrees in arc. In diametric opposition, sun slot 4 would turn eastward, or, to the left 15 degrees. The pointer 6 then (assuming that the sun has traveled 15 degrees past the meridian or noon), would read 1:00 p.m. on the scale 5. Having traveled another 15 degrees (another one-hour interval), the pointer would read 2:00 p.m. on the scale. At either of these positions, the rays of the sun enter the sphere through sun slot 3, and, since the slots have traveled an equal distance (in opposite direction), about the axis of the sphere, the rays continue through sun slot 4 and cast a bright ribbon of light on the backdrop of the sphere's shadow.

It is readily seen that there is only one position on the circumference of the sphere (regardless of the sun's position), where the sun will shine through the coinciding sun slots.

To find the time, say, at 9:00 a.m., it is only necessary to turn the sphere eastward (to the left) until the sunlight shows through both sun slots and casts a long beam through the sphere's shadow. At that point, sun slot 3 will have moved through 45 degrees arc (from the vertical position of "M" or noon). The pointer 6 will then read 9:00 on the west (a.m.) side of the scale 5.

For fractions of an hour, the scale can be divided into intervals commensurate with the accuracy desired of the instrument. The instrument itself can be made as accurate as the precision of manufacture warrants.

Having described the invention, we claim as novel:

1. A sundial comprising a hollow sphere of a material or surface covering impervious to the passage of sunlight, said sphere perforated with two sun slots, diametrically opposed, in a plane containing the horizontal axis of rotation of said sphere, one slot beginning near one intersection of said axis with said sphere and extending upward well beyond the transverse circumference of said sphere, the other beginning near the other intersection of said axis with said sphere and extending downward well beyond said transverse circumference, a pair of trunnions, one at each of said intersections, and a stand rotatably supporting said sphere upon said trunnions for maintaining the horizontal position of said axis whereon it revolves freely.

2. A sundial as recited in claim 1, said sphere having thereon a scale marked in units of 15 degrees of circumferential arc and fractions thereof along said transverse circumference, said scale beginning at a point on said transverse circumference in the plane of the upper sun slot, said scale marked toward the east (taking the south direction as that radially outward of the sphere at the first named intersection, and with the upper slot directly over said axis), thus, 1:00 p.m., 2:00 p.m., 3:00 p.m., etc., on the 15 degree marks, the intermediate marks indicating the fractions thereof, said scale being marked toward the west thus: 11:00 a.m., 10:00 a.m., 9:00 a.m., etc., on the 15 degree marks, said scale being marked "M" for noon on the transverse circumference at its upper intersection with the plane of the sun slots.

References Cited in the file of this patent
UNITED STATES PATENTS

| | | |
|---|---|---|
| 1,630,891 | Cooke | May 31, 1927 |
| 2,524,706 | Johanson et al. | Oct. 3, 1950 |

FOREIGN PATENTS

| | | |
|---|---|---|
| 123,526 | Germany | Sept. 20, 1901 |
| 214,034 | Great Britain | Apr. 17, 1924 |
| 120,686 | France | Oct. 11, 1877 |